UNITED STATES PATENT OFFICE.

OTTOKAR SERPEK, OF PARIS, FRANCE, ASSIGNOR TO SOCIÉTÉ GÉNÉRALE DES NITRURES, OF PARIS, FRANCE.

PROCESS FOR THE MANUFACTURE OF ALUMINIUM NITRID.

1,078,313. Specification of Letters Patent. Patented Nov. 11, 1913.

No Drawing. Application filed May 7, 1912. Serial No. 695,721.

*To all whom it may concern:*

Be it known that I, OTTOKAR SERPEK, a subject of the Emperor of Austria-Hungary, and a resident of 12 Rue Roquepine, Paris, France, have invented a new and useful Process for the Manufacture of Aluminium Nitrid, of which the following is a specification.

The present invention relates to a process for the manufacture of aluminium nitrid consisting in heating a mixture of carbon and alumina or aluminous substances (bauxite, kaolin, etc.) in a current of nitrogen contain free hydrogen.

It has been ascertained indeed that when a mixture of carbon and aluminous substances (bauxite, kaolin, etc.) is heated in a current of nitrogen containing hydrogen or substances capable of setting the hydrogen free from the nitrogen under the conditions of the operation, such as carbids or sulfids of hydrogen, the alumina fixes the nitrogen in the form of nitrid; it has, moreover, been found that the gases leaving the apparatus in which the reaction takes place, contain cyanogen which can be recovered by absorbing it in any known manner at the exit. This method presents the great advantage of allowing aluminium nitrid to be obtained at temperatures very considerably lower than those which it is necessary to attain when using a current of nitrogen containing no hydrogen; further, if working at the high temperatures hitherto used, it allows of quicker action.

*Example I.*

(a) A mixture of 10 parts of alumina and 4 parts of carbon was heated for one hour at 1400°–1450° C. in a current of nitrogen. The product contained 0.7% of nitrogen.

(b) An identical mixture was treated in the same conditions of temperature and time in a current of nitrogen containing hydrogen (3 volumes of hydrogen to 7 volumes of nitrogen). The product obtained contained 8.6% of nitrogen.

*Example II.*

(a) A mixture of 10 parts of bauxite and 4 parts of carbon was heated for one hour at 1500°–1520° C. in a current of nitrogen. The product obtained contained 13% of nitrogen.

(b) An identical mixture was treated in the same conditions of temperature and time in a current of nitrogen containing hydrogen (1 volume of hydrogen to 9 volumes of nitrogen). The product obtained contained 27% of nitrogen.

I claim—

The process for the manufacture of aluminium nitrid, which consists in heating at temperatures above approximately 1300 degrees C. a mixture of carbon and aluminous material in a current of nitrogen with free hydrogen.

In testimony whereof, I have signed my name to this specification, in the presence of two subscribing witnesses.

OTTOKAR SERPEK.

Witnesses:
H. C. COXE,
LÉON PEILLET.